UNITED STATES PATENT OFFICE.

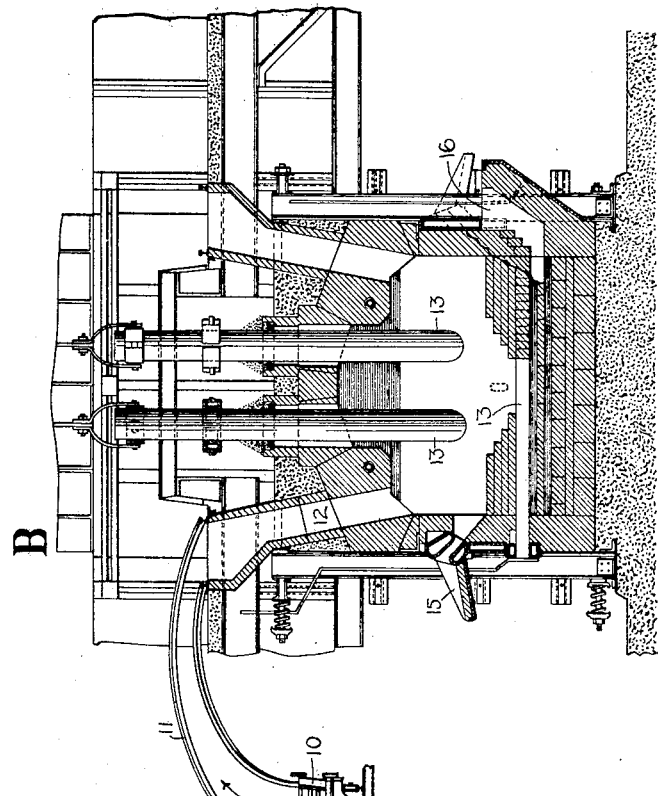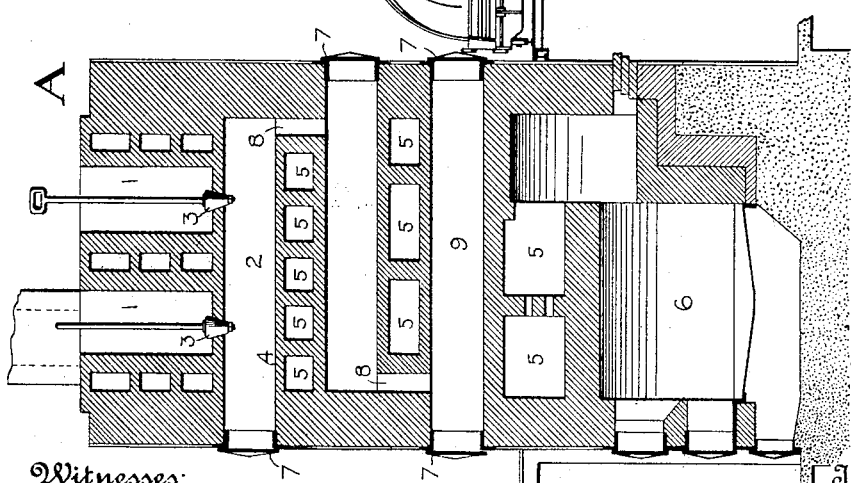

WOOLSEY McA. JOHNSON, OF HARTFORD, CONNECTICUT.

HERMETIC UNIT SMELTING SYSTEM.

1,327,282.  Specification of Letters Patent.  Patented Jan. 6, 1920.

Application filed February 18, 1915. Serial No. 8,978.

*To all whom it may concern:*

Be it known that I, WOOLSEY McA. JOHNSON, a citizen of the United States, and residing at Hartford, in the county of Hartford and State of Connecticut, have invented a new and Improved Hermetic Unit Smelting System, of which the following specification is a full disclosure.

This invention proposes an improved metallurgical system, and it also deals with an improved mode and means for hermetically transporting a between-product through the air from one step to another in the treatment.

Among the objects of the invention may be noted; (A) the provision of an efficient multiple-stage system for smelting zinc ores, together with transportation-units for conveying sensitively oxidizable material from one stage to another; (B) the provision of an inexpensive car for hermetically transporting through air hot material requiring isolation from oxygen; (C) the provision of a vehicle constructed to permit rapid loading and unloading; to be substantially closed against the admission of air, by means readily operated from a convenient point on the vehicle, and to withstand and conserve the heat of pre-heated material; and (D) the provision of a transportation system combining in an efficient manner certain stages of a metallurgical process with a view to reducing the cost of installation and maintenance of the apparatus as a whole.

Other objects will be in part obvious from the annexed drawings and in part indicated in connection therewith by the following analysis of the invention.

This invention accordingly consists in the features of construction and operation, combinations of parts and of component steps and in the unique relations of the members and operations and in the relative proportioning, disposition and sequence thereof; all as more completely outlined herein.

Figure 2:
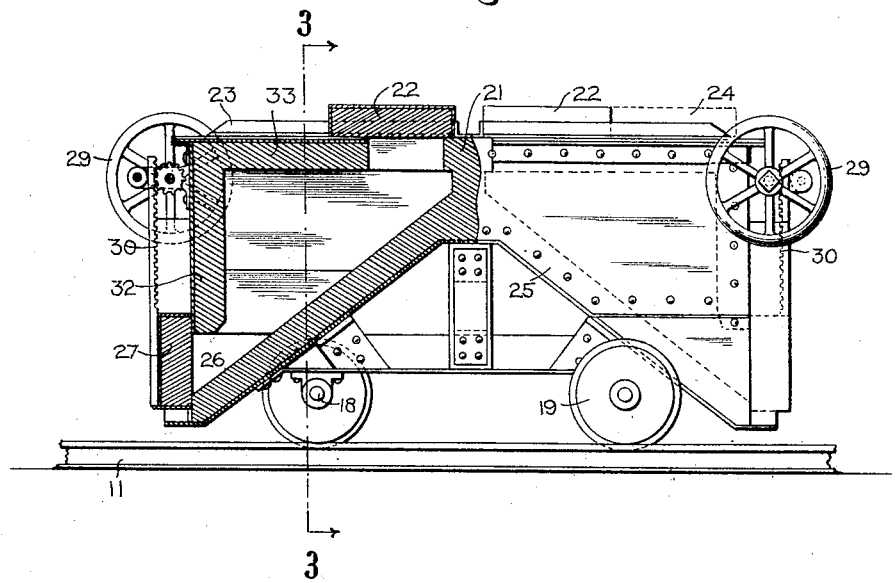
Figure 3:
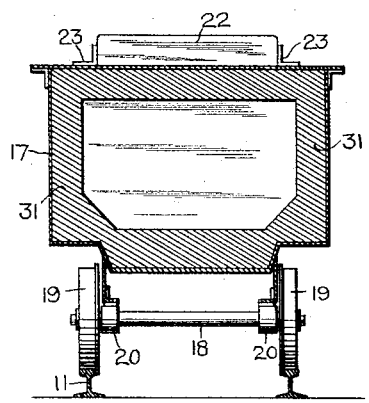
Figure 4:
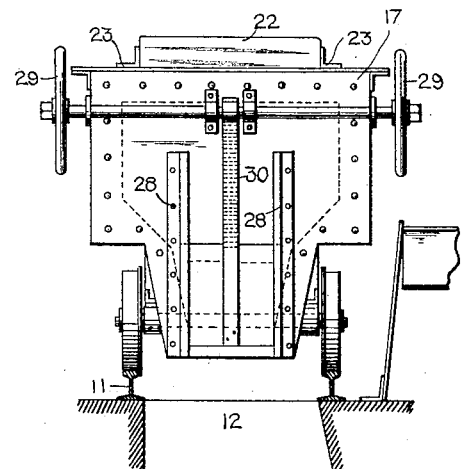

To enable others skilled in the art so fully to comprehend the underlying features thereof that they may embody the same by the numerous modifications in structure and relation contemplated by this invention, drawings depicting a preferred form of apparatus have been annexed as a part of this disclosure, and in such drawings, like characters of reference denote corresponding parts throughout all the views, of which:

Figure 1 is a sectional elevation, partly diagrammatic, of two stages of a continuous zinc system; together with a transportation system connecting the two; Fig. 2 is a longitudinal elevation, partly in section, of a preferred type of car; Fig. 3 is a transverse section on the line 3—3, Fig. 2; and Fig. 4 is an end elevation of the car of Figs. 2 and 3.

By way of explanation, it may be stated that in one efficient metallurgical process for smelting zinc ores, a sensitive hot intermediate product is formed which would oxidize rapidly if it were exposed to the air; the system requiring the exclusion of air from this between-product. It is found desirable, therefore, to convey this hot material from one stage of the system to another and at the same time to protect it not only from oxidation, which would create difficulties in a following stage, but also to preserve the heat of the intermediate product, otherwise such heat would have to be supplied through an expensive form of energy in the following stage. The present invention proposes a system comprising stages carried on in independent units, not connected by a hermetically sealed passage thereby realizing many advantages in construction and operation not attainable in a system whose units require an air-tight inter-connection.

Referring now more particularly to Fig. 1 of the drawings, there are illustrated two units, A and B, of a zinc-smelting system wherein the sufficiently-roasted ore-mixture is first dumped into the upper compartments 1 and is therein dried of any moisture absorbed after leaving the roasters and it is then admitted at suitable intervals to the upper pre-heating ore-chamber 2 by lifting manually the carbon plugs 3. At this point, the ore-mixture is subjected to heat transmitted through the walls 4 from the heating gases flowing through the passages 5, in a generally upward direction from the combustion-chamber indicated at 6; providing in this manner what may be termed an "external heating" system, as distinguished from an "internal heating" system, where there is direct contact between the source of heat and the material to be heated. By removing the doors 7, and working over the ore with rabbles, the ore is rabbled either manually or mechanically through the passages 8 from each ore-chamber to the one below it, coming into contact with the walls at progressively higher temperatures by virtue of this counter-current arrangement of parts. The material thus treated may be a mixture of roasted ore bearing oxids of zinc, cadmium and iron, together with solid carbon, as coke, and gas-yielding carbon, as coal, and more or less sulfur and secondary non-volatile metals such as lead, copper, etc. The temperature used will be less than that needed for the substantial reduction of the zinc oxid, but it will be sufficiently high to reduce the cadmium from its oxid and to reduce the iron oxid to sponge iron, and at the same time evolve gases that will sweep out the volatilized cadmium and carry it to a suitable collecting means.

From the lowermost ore-chamber 9 the hot and very sensitive between-product formed in this unit A of the system is raked out or otherwise withdrawn from the chamber 9 into successive vehicles or cars 10 brought opposite the door 7 of the chamber 10 along the rails 11. Each loaded vehicle is then hermetically sealed as hereinafter described and conveyed along the track 11 to the next unit B of the system. Here the car is brought to rest at the charging-floor at a point directly over one of the charging-hoppers 12 (Figs. 1 and 4) into which the cargo of the vehicle may be dumped for further treatment in accordance with the next stage of the system. This further treatment consists generally in subjecting the material to an intense zinc-smelting temperature in the internal-heating unit comprising the electrodes 13. The volatilized metal leaves this stage B through a flue (not shown) to a further unit (not shown) where the zinc is condensed or burned to form zinc-oxid. The waste-elements, dissolving into and forming a readily fusible slag, are withdrawn as slag occasionally through the "slag-monkey" 15, and the heavier lead is similarly withdrawn through the lead-well 16.

For a more specific consideration of the car 10, reference is had to Figs. 2, 3 and 4, wherein a preferred type of car is illustrated in longitudinal elevation, transverse section, and end elevation, respectively. A single-truck construction is here shown, comprising the frame 17 supported from the axles 18 of the wheels 19 by journals indicated at 20. A transverse partition 21 located approximately midway between the wheels 19 divides the cars 10 into two symmetrically disposed compartments for cargo, each arranged for loading and unloading operations independently of the other. Cargo is admitted to either compartment by sliding back manually the tiled cover 22 mounted to slide between angle-bar guides 23 along the top of each compartment, from the closed position indicated in solid lines in Fig. 2, to the open position indicated in dotted lines at 24. At the lower end of the inclined tiled bottom 25 of each compartment is the discharge-opening 26 adapted to be completely covered by the vertically sliding door 27 mounted for reciprocation within the guides 28 by means of the handwheels 29 operating through the rack-and-pinion mechanism 30. Tiled sides 31, end-walls 32, and top 33, complete each compartment. The material used in construction may of course be varied, but it has been found preferable in practice to utilize for this purpose steel plates about three-sixteenths of an inch thick and fitted together as indicated in Figs. 2 and 4 to form a reasonably airtight structure. The lining formed of tiles of fire-brick serves the double purpose of closing many of the apertures incident to inexpensive steel construction, and adds a heat-insulator to conserve the heat-energy in a cargo of elevated temperature, as well as protecting the operators from injury in loading and unloading and in moving the car from place to place.

The operation of the system (that is, the process as well as the apparatus) is as follows: The ore to be smelted is dumped into the drying compartments 1 together with suitable ingredients to form a charge of the proper composition. At intervals the carbon plugs 3 are manually raised, admitting the ore to the upper ore-chamber 2, whence it is raked or rabbled to the second and third chambers, coming into contact with successively hotter walls 4 heated by the gases ascending from the combustion-chamber 6 through the flues 5. The between-product resulting from this operation in stage A is withdrawn through the doors 7, where it is dumped into successive car compartments through the loading openings 34 therein, the covers 22 at this time being in the position illustrated in dotted lines in Fig. 2, and the discharge doors 27 closed. When each compartment has been loaded, the cover 22 is promptly moved to the solid-line position, Fig. 2, and the cargo becomes hermetically sealed and protected from the air. In order to counteract any disadvantageous results that might occur by an inflow of air from the small apertures that exist in any inexpensive car-construction, a small amount of material is preferably added to each compartment-load of between-product for the purpose of furnishing continually a pressure within the compartment somewhat above atmospheric; in this way effectually preventing the admission of air from without. For this material any suitable substance evolving a non-oxidizing gas at the normal temperature of the between-product may be utilized; a carbonaceous material such as wood or soft coal has been found satisfactory. The car is now moved without undue delay along the track 11 to stage B of the system, where it is brought to rest in such a position that when the discharge-door 27 of the compartment is raised by the rack-and-pinion mechanism 30, the between-product will drop into one of the charging-hoppers 12, (Figs. 1 and 4) whence it passes to the heating-chamber, to be electrically smelted into vapor passing off through a flue (not shown) to the condenser (not shown). Slag is withdrawn at the " slag-monkey " 15, and lead at the lead-well 16.

It will thus be seen that there is provided a system in which the objects of the invention are attained and other advantageous results secured.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure the following combinations of steps and elements, or equivalents thereof, by Letters Patent of the United States:—

1. In the metallurgical art, the process which comprises heating a charge to form a readily oxidizable between-product, conveying said between-product through air without oxidation, and smelting said between-product to form metallic vapor.

2. In the metallurgical art, the process which comprises drying a charge including ore, heating said charge in the absence of air by heat applied externally to form a between-product readily oxidizable, transporting said between-product in cars without air contact therewith, and smelting said between-product to form metallic vapor and slag.

3. In the metallurgical art, the process which comprises treating ore in one stage to form a sensitive between-product, loading said product into a car, together with a material to evolve a non-oxidizing gas, closing said cars substantially hermetically, conveying said car to the next stage of the system, and unloading said product into said next stage.

4. In the metallurgical art, the process which comprises a preheating stage for converting a charge including ore into a readily oxidizable between-product, a car for receiving said product and conveying it free from air contact, and another stage for receiving said product from said car and subjecting it to further treatment.

5. In the art of transferring metal ores from a location of one heat treatment to a different location there to be subjected to another treatment, the process which consists in subjecting a body of ore to a heat treatment, separating the body of hot ore into distinct loads convenient for transportation, hermetically sealing each load and separately conveying each hermetically sealed load through air but free of air contact to said different location.

6. In the art of smelting metal ores, the process which consists in partly smelting ores at one temperature in a furnace to form a material which is liable to oxidize at that temperature at which it is discharged from said furnace, removing said material to a second furnace to complete the smelting at a higher temperature and protecting the partly smelted material from the external air during the removal step so as to prevent oxidation.

7. In the art of smelting ores, the process which consists in subjecting the ore to the action of a roasting furnace forming incidentally a hot intermediate product liable to oxidize rapidly if exposed to air, successively withdrawing limited amounts of said product from the furnace, transferring said limited amounts to a second furnace there to be subjected to an intense smelting temperature and protecting said product from the air to minimize oxidation and from excessive heat losses while being so transferred.

8. In the art of smelting ores, the process which consists in subjecting the ore to the action of a roasting furnace forming incidentally a hot intermediate product liable to oxidize rapidly if exposed to air, successively withdrawing limited amounts of said product from the furnace, transferring said limited amounts to a second furnace there to be subjected to an intense smelting temperature and adding a non-oxidizing gas to the product thereby to protect the same from the action of air.

In witness whereof I hereunto subscribe my name, as attested by the two subscribing witnesses.

WOOLSEY McA. JOHNSON.

Witnesses:
 LEON MINTZ,
 B. COOKE.